(12) United States Patent
Dixon

(10) Patent No.: US 6,318,677 B1
(45) Date of Patent: Nov. 20, 2001

(54) METHOD AND APPARATUS FOR GENERATING A STABLE LEADING-EDGE LIFTING-VORTEX CONTROLLER

(76) Inventor: Charles J. Dixon, 1712 Victoria Way, Kennesaw, GA (US) 30152

(*) Notice: Subject to any disclaimer, the term of this patent is extended or adjusted under 35 U.S.C. 154(b) by 0 days.

(21) Appl. No.: 09/370,645

(22) Filed: Aug. 6, 1999

(51) Int. Cl.$^7$ ................................................. B64C 23/06
(52) U.S. Cl. ............................................. 244/199; 244/214
(58) Field of Search .................................. 244/198, 199, 244/204, 214

(56) References Cited

U.S. PATENT DOCUMENTS

| | | |
|---|---|---|
| 2,503,585 * | 4/1950 | Loedding .......................... 244/214 |
| 2,769,602 * | 11/1956 | Furlong ............................. 244/199 |
| 3,090,584 | 5/1963 | Kuchemann et al. . |
| 3,486,720 | 12/1969 | Seglem et al. . |
| 3,596,854 | 8/1971 | Haney, Jr. . |
| 4,293,110 | 10/1981 | Middleton et al. . |
| 4,323,209 | 4/1982 | Thompson . |
| 4,378,922 | 4/1983 | Pierce . |
| 4,485,992 | 12/1984 | Rao . |
| 4,655,419 | 4/1987 | Vander Hoeven . |
| 4,705,240 | 11/1987 | Dixon . |
| 4,913,381 | 4/1990 | Mabey . |
| 5,039,032 | 8/1991 | Rudolph . |
| 5,054,720 | 10/1991 | Page . |
| 5,058,837 | 10/1991 | Wheeler . |
| 5,072,894 | 12/1991 | Cichy . |
| 5,253,828 | 10/1993 | Cox . |
| 5,255,881 | 10/1993 | Rao . |
| 5,598,990 | 2/1997 | Farokhi et al. . |
| 5,634,613 | 6/1997 | McCarthy . |

* cited by examiner

Primary Examiner—Robert P. Swiatek
(74) Attorney, Agent, or Firm—Joel D. Myers; Myers & Associates, P.C.

(57) ABSTRACT

Method and apparatus for generating a stable leading edge lifting vortex controller that significantly improves flight control and safety of an aircraft. More specifically, in a preferred embodiment, the present invention is generally a triangular or diamond-shaped member, as seen in a plan view, having a leading edge and a trailing edge wherein the trailing edge of the member is attached to the leading edge of an aircraft wing in substantially the same plane as the wing. The distal end of the leading edge of the member has a slightly drooped rounded nose. The member has a variable thickness wherein the upper surface of the member has a camber and wherein the member is substantially shaped like an airfoil. The thickness at the centerline of the member proximal to the wing is approximately the thickness of the leading edge of the wing to provide a smooth transition along the centerline. The thickness decreases from the centerline to the two distal opposing edges from the centerline that contact the leading edge of the wing to form a sharp point having negligible thickness. As air travels over the leading edges of the member, a lifting vortex is generated on each side of the member. These vortices travel on the low pressure side of the wing generally in an aft direction thus mixing high-energy airflow with the slower air within the boundary layer thereby reducing boundary layer separation along the wing.

13 Claims, 6 Drawing Sheets

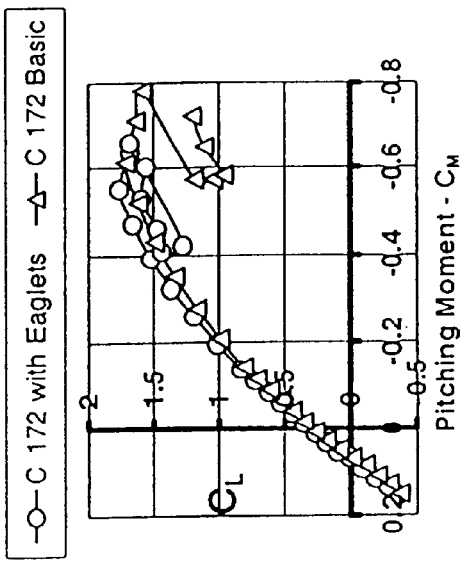
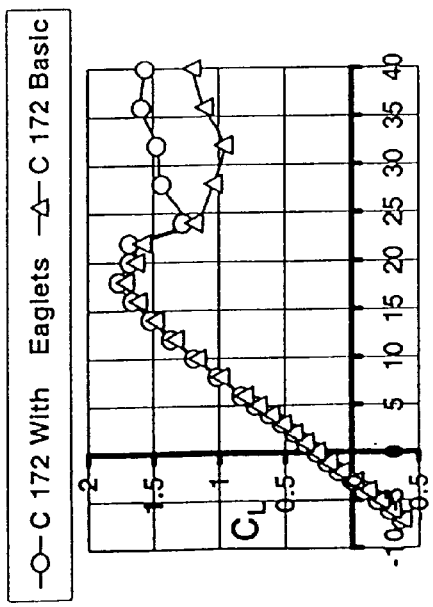
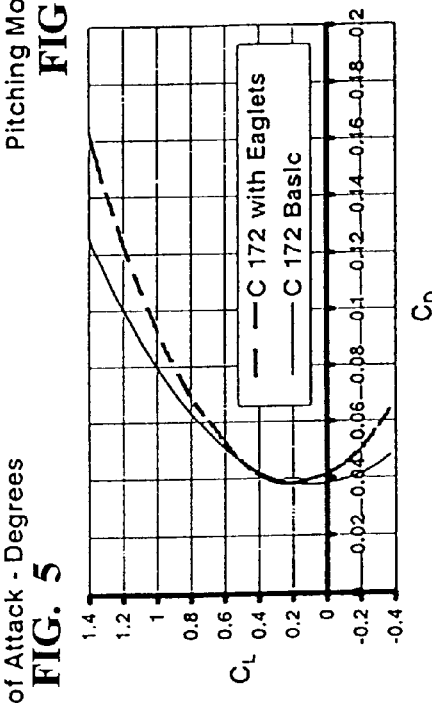
C 172 Longitudinal Aerodynamics With and Without "Eaglets"
FIG. 5
FIG. 6
FIG. 7

METHOD AND APPARATUS FOR GENERATING A STABLE LEADING-EDGE LIFTING-VORTEX CONTROLLER

TECHNICAL FIELD

The present invention relates generally to aerodynamics, and, more specifically, to a method and apparatus for generating a stable leading-edge lifting-vortex controller.

BACKGROUND ART

Lift of an airplane wing is a function of its forward speed and angle of attack. An airfoil such as an aircraft wing develops a lift force as a result of air movement across generally opposite sides or surfaces of an airfoil at unequal velocities. In the typical case of an aircraft wing, for example, air moves across the upper wing surface at a greater velocity than across the lower wing surface, thus producing a differential pressure on the wing which generates a net upward lift force thereon. The amount of differential pressure and consequently the amount of lift developed by a wing generally is dependent upon the difference in velocities of air movement across the opposed wing surfaces, and the relatively greater velocity of air movement across a wing upper surface relative to the wing lower surface commonly is obtained by appropriately forming the camber of the wing upper surface with respect to the lower surface.

Under certain conditions of aircraft operation, the relatively streamlined airflow across the upper surface of the wing tends to become partially or substantially completely separated from the wing upper surface. This flow separation typically occurs with an aircraft wing at relatively low flying speeds found, for example, at landing or takeoff conditions when the wing is being operated at a relatively high angle of attack and when maximum lift generation is particularly critical. In many aerodynamic components the flow detachment originates at the trailing edge of the airfoil section and expands both forwardly and in a spanwise direction as the angle of attack is increased.

In an attempt to remedy this problem, vortex generator devices are used to delay or eliminate flow separation along a flow control surface. Vortex generators on aircraft are used to mix high-energy air outside of the boundary layer with the retarded air within the boundary layer. This allows the boundary layer to remain attached longer in regions of the flow with adverse pressure gradients. Following their initial use, a number of experimental studies indicated that if vortex generators were incorporated properly, they could be used to improve lifting effectiveness, extend the point of buffet onset, improve lift-to-drag ratio, or enhance stability.

An example of a typical vortex generator is the conventional vane type vortex generators used widely on aircraft for lift enhancement and drag reduction. Such a device may be found by reference to U.S. Pat. No. 5,253,828 to Cox. Vane type vortex generators are sharp blades extending normal to the surface and with an angle of attack to the flow at least during the time vortices are to be generated. Flow migrating over the outer tip of each vane can create a useful streamwise vortex that mixes high speed fluid from the free stream into the sluggish energy-deficient boundary layer. This mixing increases the energy in the boundary layer, making it resistant to flow separation. The process is called passive boundary layer control.

It is also common practice to place vortex generators at certain selected locations on an upper surface of an airfoil to extend the onset of flow separation. An example of such a device may be found by reference to U.S. Pat. No. 4,323,209 to Thompson. By creating the vortex, the high momentum fluid particles outside the boundary layer are mixed with the retarded boundary layer air at the surface, thus avoiding or extending the occurrence of separated flow.

Essentially, vortex lift control involves stabilizing the vortex shed from the leading edge of the wing so as to lock the leading edge vorticity along the spanwise direction of the wing. This causes lift-producing, stream-line airflow to pass over the upper surface of the wing, over the locked vortex, and then to become reattached to the wing surface. This results in an effective increase of the wing camber and thus increased lift.

However, many of the prior art devices are deficient in light of the present device. For instances, many of the designs create substantial drag that outweighs any beneficial lifting affect created by the device. Additionally, many of the previous designs fail to produce sufficient lift to justify their increased costs.

It is readily apparent that a new, improved and relatively inexpensive leading edge lifting vortex controller is needed that is attached to the leading edge of an airfoil in substantially the same plane as the airfoil and that provides significant aerodynamic improvements yet substantially limits detrimental drag affects. It is, therefore, to the provision of such an improvement that the present invention is directed.

BRIEF SUMMARY OF THE INVENTION

Briefly described, in a preferred embodiment, the present invention overcomes the above-mentioned disadvantages by providing a method and apparatus for generating a stable leading edge lifting vortex controller that significantly improves flight control and safety of an aircraft. More specifically, in a preferred embodiment, the present invention is generally a triangular or diamond-shaped member, as seen in a plan view, having a leading edge and a trailing edge wherein the trailing edge of the member is attached to the leading edge of an aircraft wing in substantially the same plane as the wing. The forward most portion of the leading edge of the member has a slightly drooped rounded nose. The member has a variable thickness wherein the upper surface of the member has a camber and wherein the member is substantially shaped like an airfoil. The thickness at the centerline of the member proximal to the wing is approximately the thickness of the leading edge of the wing to provide a smooth transition along the centerline. The thickness decreases from the centerline to the two distal opposing edges from the centerline that contact the leading edge of the wing to form a sharp point having negligible thickness.

As air travels over the leading edges of the member, a lifting vortex is generated on each side of the member. These vortices travel on the low pressure side of the wing generally in an aft direction thus mixing high-energy airflow with the slower air within the boundary layer thereby reducing boundary layer separation along the wing. For various angles of attack, these aerodynamic improvements have shown to increase the lifting coefficient and roll damping; reduce the yawing moment; and reduce the effects of stall on aileron effectiveness. Preferably two to three members are placed along the leading edge of each wing; however, depending on the wing design and the desired effect, a plurality of members may be utilized.

In alternate embodiments, the member may be flat with sharp leading edges when utilized with wings having thin airfoils. In addition, the member may not comprise a slightly drooped nose; however, preferably the entire member would be slightly drooped relative to the wing chordline.

A feature and advantage of the present invention is to provide a new and improved stable leading edge lifting vortex controller that can be easily attached to preexisting wing designs.

A feature and advantage of the present invention is to provide a new and improved stable leading edge lifting vortex controller that generates a beneficial lifting vortex on the low pressure side of a wing to prevent and/or delay the separation of the boundary layer airflow.

A feature and advantage of the present invention is to provide a new and improved stable leading edge lifting vortex controller that generates a beneficial lifting vortex that remains stable at angles of attack above the original stall angle of attack thus reducing the affects of stall.

A feature and advantage of the present invention is to provide a new and improved stable leading edge lifting vortex controller that generates a beneficial lifting vortex that remains stable at angles of attack above the original stall angle of attack thus assisting aircraft roll damping.

A feature and advantage of the present invention is to provide a new and improved stable leading edge lifting vortex controller that generates a beneficial lifting vortex that remains stable at various angles of attack thus increasing the overall stability of the aircraft.

A feature and advantage of the present invention is to provide a new and improved stable leading edge lifting vortex controller wherein any number of controllers may be utilized to achieve the desired aerodynamic affect for various wing designs.

A feature and advantage of the present invention is to provide a new and improved stable leading edge lifting vortex controller that is substantially airfoil shaped and positioned substantially in the same plane as the wing thus reducing any detrimental air drag affect.

A feature and advantage of the present invention is to provide a new and improved method for generating a stable leading edge lifting vortex for improving the aerodynamic performance of an aircraft.

These and other objects, features and advantages of the invention will become more apparent to one skilled in the art from the following description and claims when read in light of the accompanying drawings.

BRIEF DESCRIPTION OF THE FIGURES

FIG. 5 is a graph of the Lift Coefficient ($C_L$) to Angle of Attack for a CESSNA 172 aircraft with and without the apparatus of the present invention.

FIG. 6 is a graph of the Lift Coefficient ($C_L$) to Pitching Moment for a CESSNA 172 aircraft with and without the apparatus of the present invention.

FIG. 7 is a graph of the Lift Coefficient ($C_L$) to Drag Coefficient ($C_D$) for a CESSNA 172 aircraft with and without the apparatus of the present invention.

DETAILED DESCRIPTION OF THE PREFERRED EMBODIMENT

Figure 1:
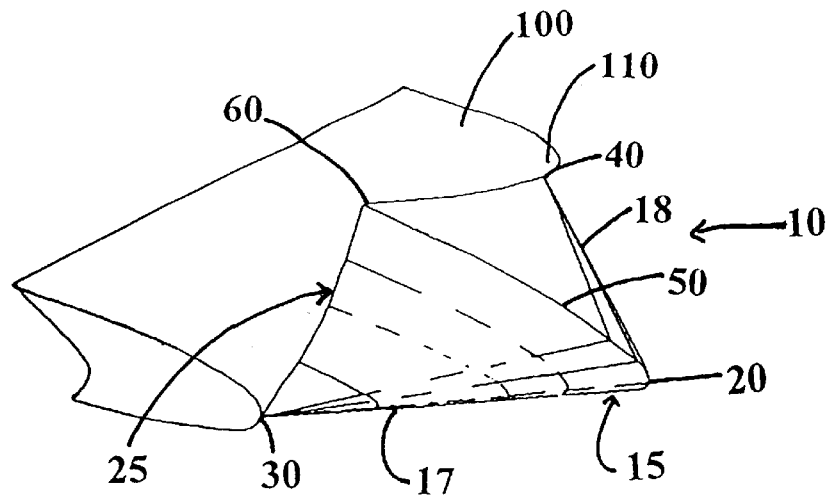
FIG. 1 is a perspective view of the apparatus according to a preferred embodiment of the present invention.

Referring now to FIGS. 1, apparatus 10 is generally a triangular-shaped member having leading edges 15 and trailing edges 25. Trailing edges 25 of apparatus 10 are attached to the leading edge 110 of wing 100 via any of many well known attaching means such as rivets (not shown). Internal load transferring structural members (not shown), well known within the art, may be incorporated within apparatus 10 to transfer any load to wing 100. Preferably, leading edges 15 of apparatus 10 comprise a slightly drooped generally rounded nose 20, and first and second rounded edges 17 and 18, respectively. First and second rounded edges 17, 18 extend back from nose 20 to points 30 and 40, respectively on leading edge 110 of wing 100 with a separation angle greater than 0 degrees but less than 180 degrees, thus forming a generally triangular shape as seen from a plan view. Centerline 50, in an alternate embodiment, may extend past leading edge 110 of wing 100, thus giving apparatus 10 a generally diamond shape as seen from a plan view.

Figure 4:
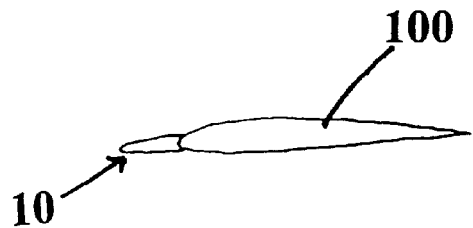
FIG. 4 is a cross-sectional view along lines 4—4 of FIG. 2 according to a preferred embodiment of the present invention.

Apparatus 10 is of variable thickness wherein the general cross-sectional shape along centerline 50 is preferably airfoil shaped, as shown in FIG. 4, and wherein the thickness of apparatus 10 decreases from centerline 50 to first and second rounded edges 17, 18 and to points 30 and 40. Points 30 and 40 form generally sharp mating edges having negligible thickness. The thickness along centerline 50 proximal to leading edge 110 of wing 100 is approximately the thickness of leading edge 110.

Figure 2:
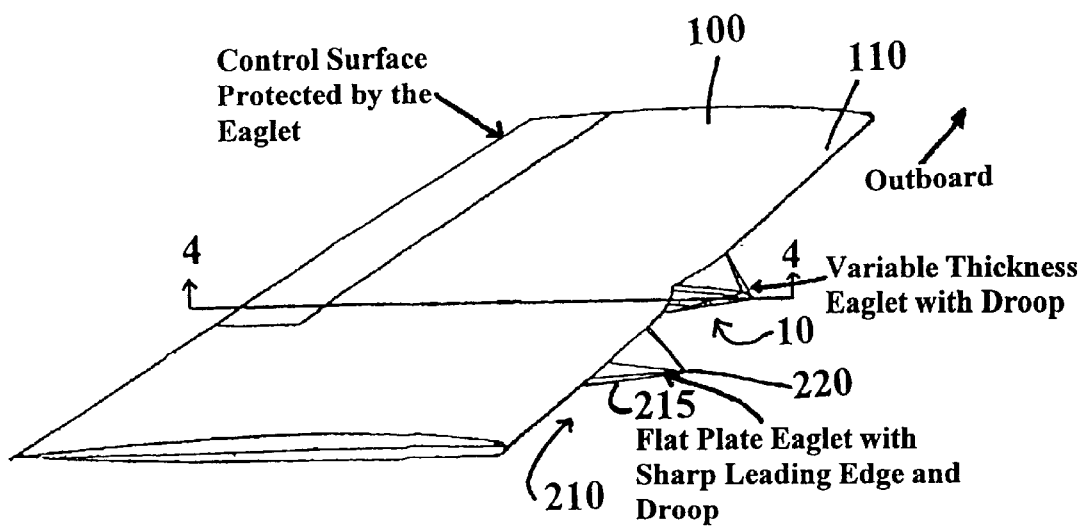
FIG. 2 is a perspective view of the apparatus showing a preferred and alternate embodiment of the present invention.

As seen from FIG. 2, in an alternate embodiment 210, leading edges 215 and drooped nose 220 are formed as sharp edges. The thickness of alternate embodiment 210 is negligible thus creating a flat-plat member. It should also be noted that in additional alternate embodiments the nose at the leading edge may be formed without a droop; however, preferably the entire flat-plate member would be slightly drooped relative to the airfoil chordline.

Figure 3:
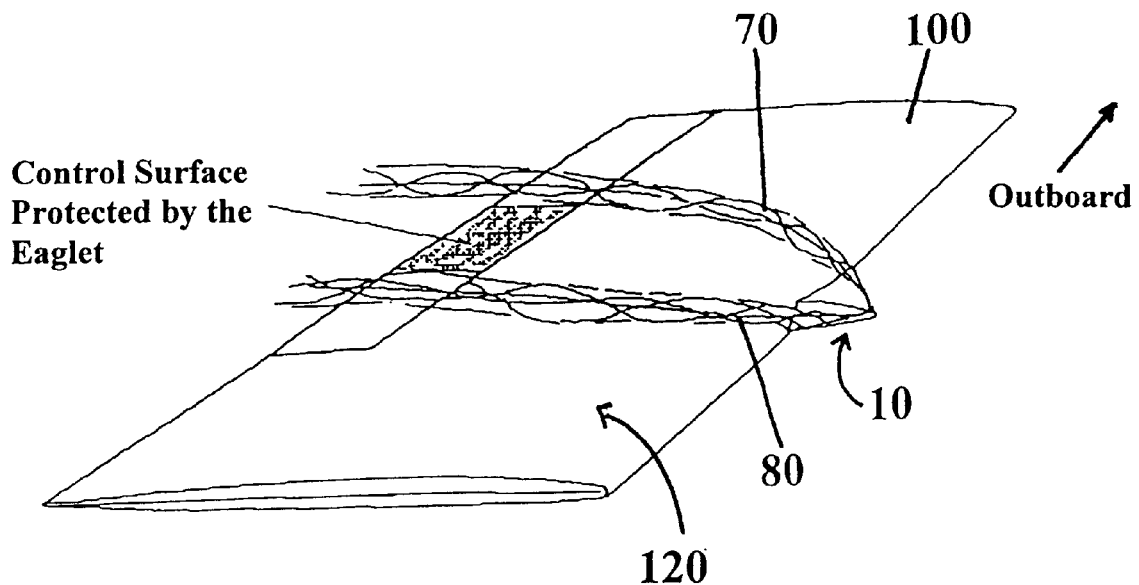
FIG. 3 is a perspective view of the apparatus in use according to a preferred embodiment of the present invention showing the generated lifting vortex and the general path of travel across the upper surface of the wing.

In use, as air travels over leading edges 15 of apparatus 10, lifting vortices 70, 80, as best seen from FIG. 3, are generated on each side of apparatus 10. Lifting vortices 70, 80 travel on low pressure side 120 of the wing 100 generally in an aft direction thus mixing high-energy airflow with the slower air within the boundary layer thereby reducing boundary layer separation along wing 100. For various angles of attack, these aerodynamic improvements have been shown to increase the lifting coefficient and roll damping; reduce the yawing moment; and reduce the effects of stall on aileron effectiveness. Preferably two to three members are placed along the leading edge of each wing; however, depending on the wing design and the desired effect, a plurality of members may be utilized.

Figure 8:
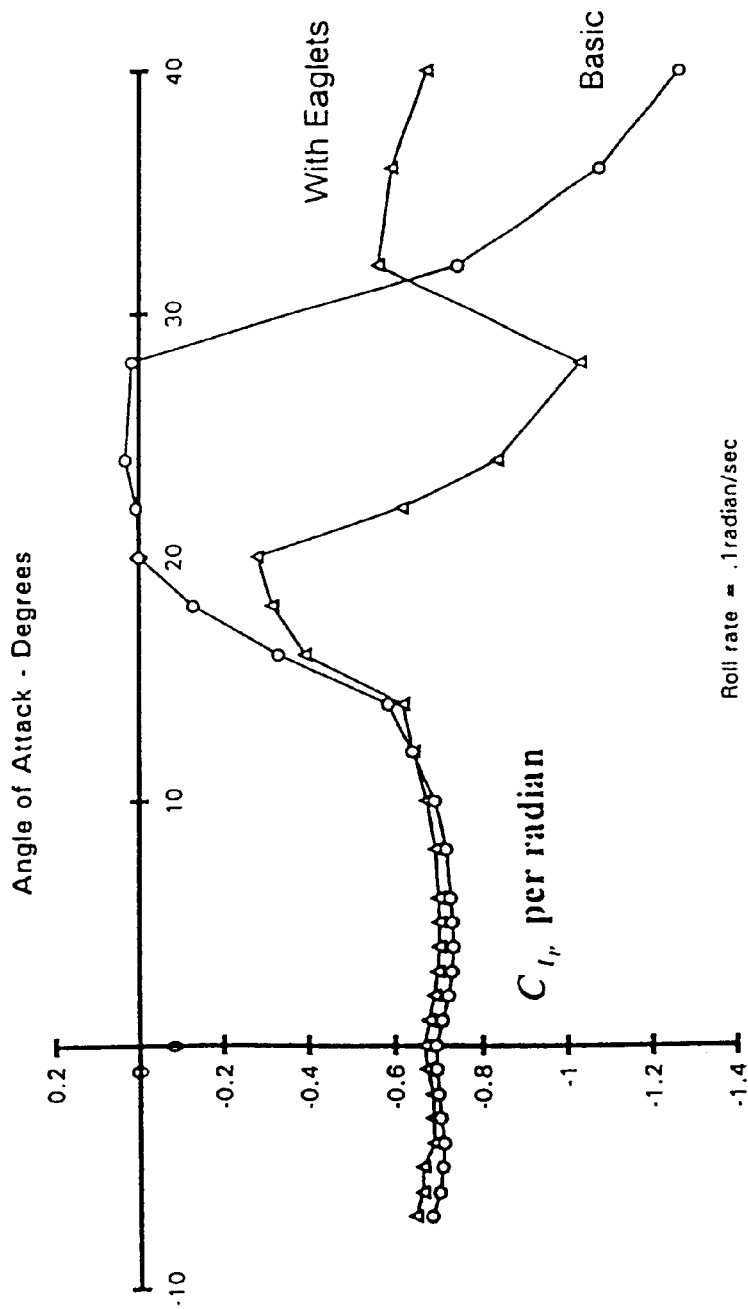
FIG. 8 is a graph showing roll damping for a CESSNA 172 aircraft with and without the apparatus of the present invention.
Figure 9:
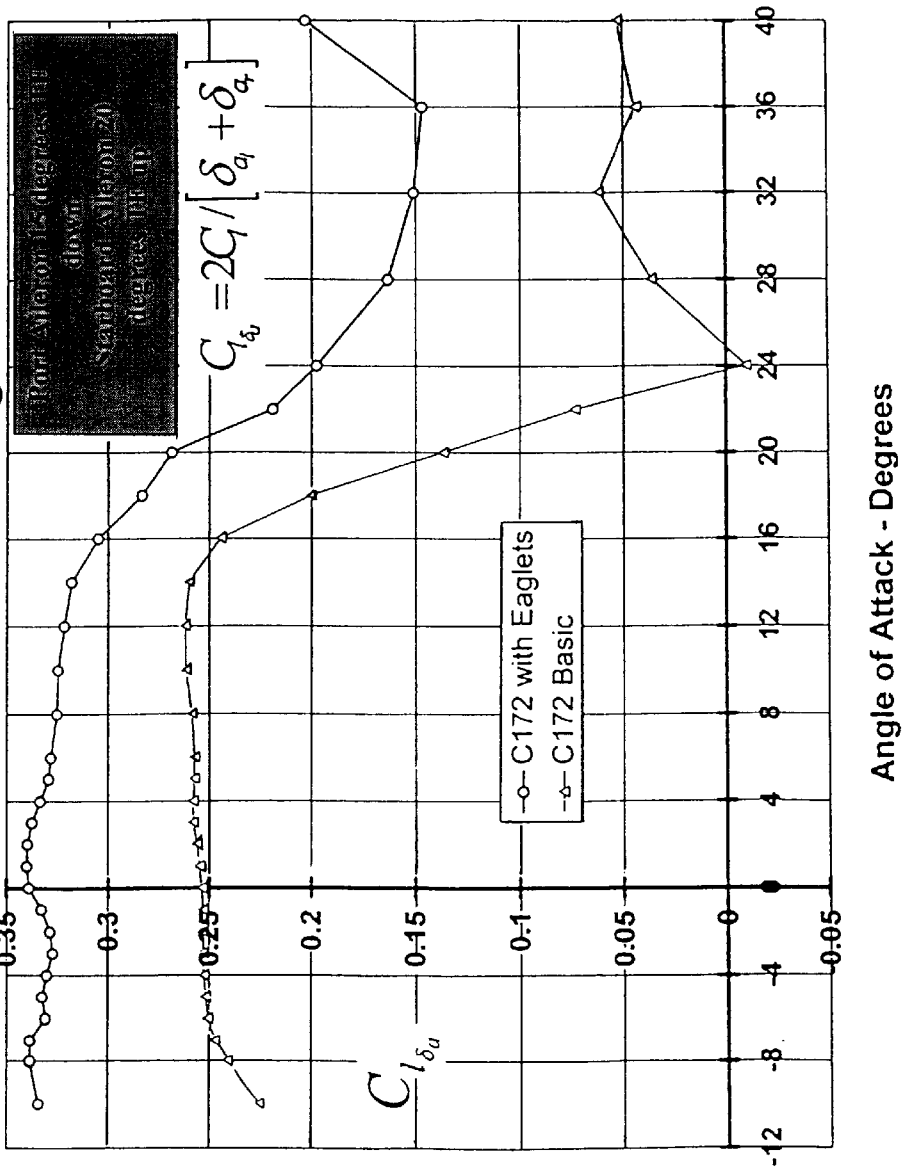
FIG. 9 is a graph showing the effect of stall on aileron effectiveness for a CESSNA 172 aircraft with and without the apparatus of the present invention.
Figure 10:
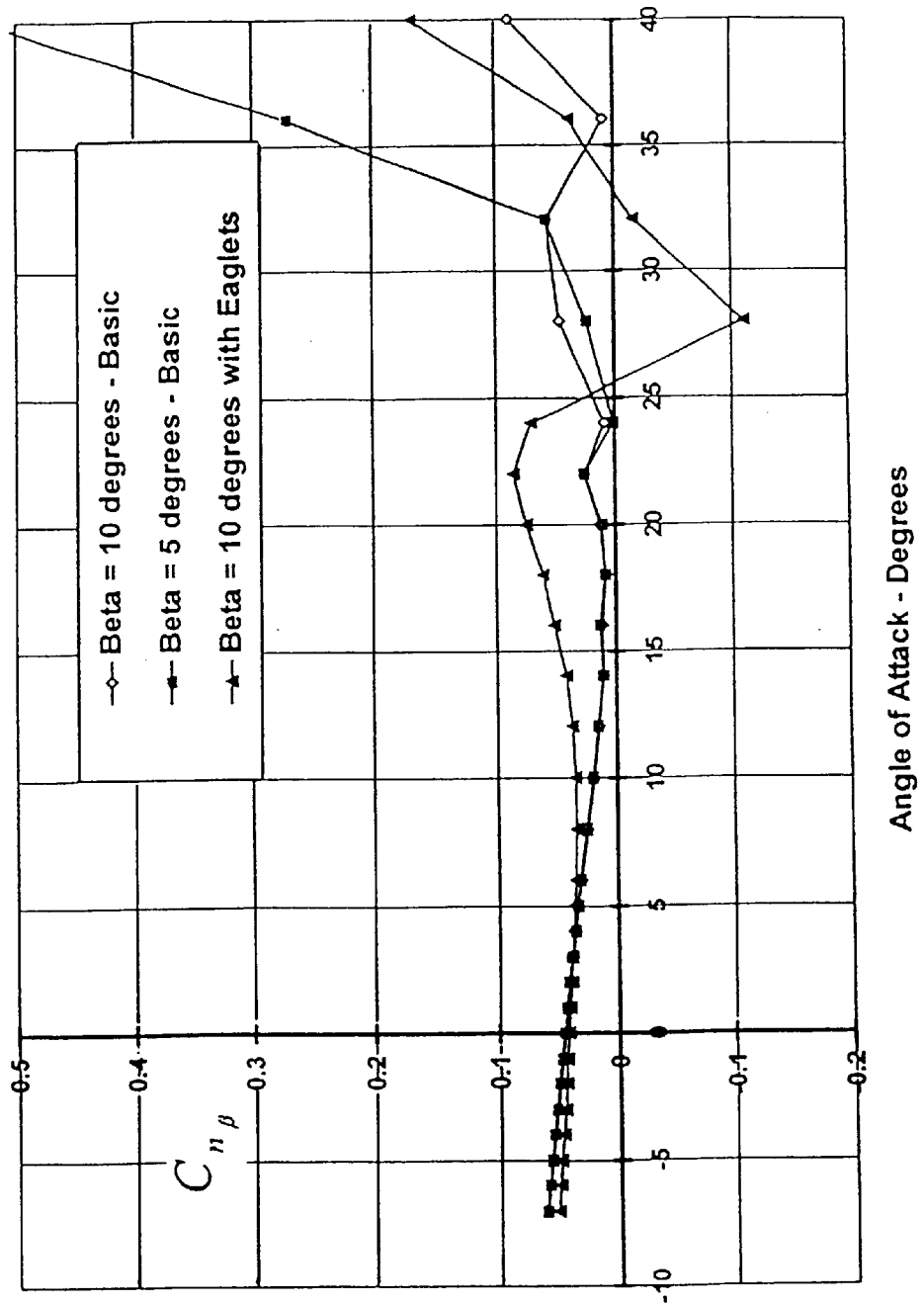
FIG. 10 is a graph showing the effect of yaw on yawing moment for a CESSNA 172 aircraft with and without the apparatus of the present invention.

FIGS. 5–7 represent analytical data showing the longitudinal aerodynamics for a CESSNA 172 with and without apparatus 10. As can be seen from FIG. 5, the stall angle is approximately 18 degrees. FIG. 8 represents analytical data showing how a CESSNA 172 having apparatus 10 attached thereto experiences improved roll damping at various angles of attack as compared to a CESSNA 172 without apparatus 10. Roll damping is achieved for the CESSNA 172 having apparatus 10 up through a 40 degree angle of attack, whereas for the CESSNA 172 without apparatus 10, roll damping ceases to exist for angles of attack between approximately 20–28 degrees. FIG. 9 represents analytical data showing the improved aileron effectiveness of a CESSNA 172 having apparatus 10 attached thereto at various angles of attack. FIG. 10 represents analytical data showing that apparatus 10 installed on a CESSNA 172 improved direction stability up past stall to an angle of attack of approximately 25 degrees.

The above detailed description of a preferred embodiment or alternate embodiments are for exemplary purposes only and are not meant to limit the scope or spirit of the invention as defined by the appended claims.

What is claimed is:

1. An apparatus for generating a leading edge lifting vortex for increasing the lift and control of an aircraft wing having an upper surface, a lower surface, a leading edge and a trailing edge wherein streamwise airflow is present, comprising:
   a member having a leading edge, a trailing edge and a nose, said member having a substantially triangular shape; and
   means for attaching said trailing edge of said member to the leading edge of the wing,
   wherein when the streamwise airflow travels across said member, a lifting vortex is generated along said leading edge of said member and travels streamwise across the upper surface of the wing thus controlling the separation of the streamwise airflow from the upper surface of the wing.

2. The apparatus of claim 1, wherein said attaching means are rivets.

3. An apparatus for generating a leading edge lifting vortex for increasing the lift and control of an aircraft wing having an upper surface, a lower surface, a leading edge and a trailing edge wherein streamwise airflow is present, comprising:
   a member having an upper surface, a lower surface, a leading edge, a trailing edge and a nose, said upper surface of said member having a camber such that said member has substantially an airfoil shape, said nose positioned along said leading edge of said member and distal from said trailing edge; and
   means for attaching said trailing edge of said member to the leading edge of the wing,
   wherein when the streamwise airflow travels across said member, a lifting vortex is generated along said leading edge of said member and travels streamwise across the upper surface of the wing thus controlling the separation of the streamwise airflow from the upper surface of the wing.

4. The apparatus of claim 3, wherein said attaching means are rivets.

5. The apparatus of claim 3, wherein said member is further defined by having a first leading edge and a second leading edge, said first leading edge and said second leading edge extend back from said nose to the leading edge of the wing, wherein the angle between said first leading edge and said second leading edge is greater than 0 degrees and less than 180 degrees, thus forming a generally triangular plan view shape.

6. The apparatus of claim 5, wherein said nose, said first leading edge and said second leading edge proximal to said nose are rounded, and wherein the thickness of said member is tapered to said first leading edge and said second leading edge proximal to the leading edge of the wing such that said first leading edge and said second leading edge are sharp edges proximal to the wing.

7. The apparatus of claim 6, wherein the thickness at the center of said member proximal to the leading edge of the wing is approximately equal to the thickness of the leading edge of the wing, wherein a smooth transition is formed between said member and the leading edge of the wing proximal to the center of said member.

8. An apparatus for generating a leading edge lifting vortex for increasing the lift and control of an aircraft wing having an upper surface, a lower surface, a leading edge and a trailing edge wherein streamwise airflow is present, comprising:
   a member having an upper surface, a lower surface, a first leading edge, a second leading edge, a trailing edge and a nose, said upper surface having a camber such that said member has substantially an airfoil shape, said nose positioned along said leading edge of said member and distal from said trailing edge, said first leading edge and said second leading edge extend back from said nose to the leading edge of the wing, wherein the angle between said first leading edge and said second leading edge is greater than 0 degrees and less than 180 degrees, thus forming a generally triangular plan view shape; and
   means for attaching said trailing edge of said member to the leading edge of the wing,
   wherein when the streamwise airflow travels across said member, a lifting vortex is generated along said first leading edge and said second leading edge of said member and travels streamwise across the upper surface of the wing thus controlling the separation of the streamwise airflow from the upper surface of the wing.

9. The apparatus of claim 8, wherein said attaching means are rivets.

10. The apparatus of claim 8, wherein said nose, said first leading edge and said second leading edge proximal to said nose are rounded, and wherein the thickness of said member is tapered to said first leading edge and said second leading edge proximal to the leading edge of the wing such that said first leading edge and said second leading edge are sharp edges proximal to the wing.

11. The apparatus of claim 10, wherein the thickness at the center of said member proximal to the leading edge of the wing is approximately equal to the thickness of the leading edge of the wing, wherein a smooth transition is formed between said member and the leading edge of the wing proximal to the center of said member.

12. A method for generating a leading edge lifting vortex for increasing the lift and control of an aircraft wing having an upper surface, a lower surface, a leading edge and a trailing edge wherein streamwise airflow is present, comprising the step of:
   (a) attaching at least one member having a nose, a leading edge, a trailing edge and a generally triangular shape to the leading edge of the wing, wherein said trailing edge of said at least one member is attached to the leading edge of the wing, and wherein when the streamwise airflow travels across said at least one member, a lifting vortex is generated along said leading edge of said at least one member and travels streamwise across the upper surface of the wing thus controlling the separation of the streamwise airflow from the upper surface of the wing.

13. A method for generating a leading edge lifting vortex for increasing the lift and control of an aircraft wing having an upper surface, a lower surface, a leading edge and a trailing edge wherein streamwise airflow is present, comprising the step of:

(a) attaching at least one member to the leading edge of the wing, said at least one member having an upper surface, a lower surface, a first leading edge, a second leading edge, a trailing edge and a nose, said upper surface having a camber such that said at least one member has substantially an airfoil shape, said nose positioned along said leading edge of said at least one member and distal from said trailing edge, said first leading edge and said second leading edge extend back from said nose to the leading edge of the wing, wherein the angle between said first leading edge and said second leading edge is greater than 0 degrees and less than 180 degrees, thus forming a generally triangular plan view shape;

wherein when the streamwise airflow travels across said at least one member, a lifting vortex is generated along said first leading edge and said second leading edge of said at least one member and travels streamwise across the upper surface of the wing thus controlling the separation of the streamwise airflow from the upper surface of the wing.

* * * * *